Figure 1:
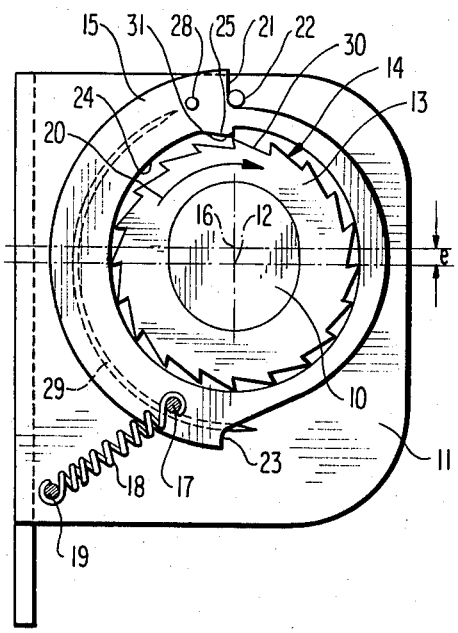

United States Patent [19]

Jahn

[11] 4,228,968
[45] Oct. 21, 1980

[54] REEL FOR AUTOMATIC SAFETY BELTS FOR VEHICLES, ESPECIALLY MOTOR VEHICLES

[75] Inventor: Walter Jahn, Ehningen, Fed. Rep. of Germany

[73] Assignee: Daimler-Benz Aktiengesellschaft, Stuttgart, Fed. Rep. of Germany

[21] Appl. No.: 38,276

[22] Filed: May 11, 1979

[30] Foreign Application Priority Data

May 20, 1978 [DE] Fed. Rep. of Germany ....... 2822099

[51] Int. Cl.³ ...................... A62B 35/00; B65H 75/48
[52] U.S. Cl. ............................... 242/107; 242/107.4 R
[58] Field of Search ........................... 242/107–107.7; 280/803, 806, 807, 808; 297/388

[56] References Cited

U.S. PATENT DOCUMENTS

| 4,026,494 | 5/1977 | Tanaka | 242/107.4 R |
| 4,106,721 | 8/1978 | Ulrich | 242/107 |

Primary Examiner—John M. Jillions
Attorney, Agent, or Firm—Craig and Antonelli

[57] ABSTRACT

A reel arrangment for automatic safety belts of motor vehicles which include a roller rotatably mounted in a housing with the roller being subjected to the action of a spring in such a manner that the spring counteracts a withdrawal of the belt. A locking device is provided for locking the roller at high belt forces with a drag disk being mounted eccentrically with respect to a gear nonrotatably connected to the roller. The drag disk includes an engagement arrangement on a bearing surface thereof which cooperates with the gear in a belt take-up direction and is subject to the action of an additional spring in the belt extraction direction. A stop is provided on the reel housing for delimiting the rotational movement of the drag disk with the stop cooperating with two matching stops on the spring-loaded drag disk. The reel housing includes a curved control and guide track or surface which cooperates with a guide pin on the drag disk.

13 Claims, 4 Drawing Figures

REEL FOR AUTOMATIC SAFETY BELTS FOR VEHICLES, ESPECIALLY MOTOR VEHICLES

The present invention relates to a safety belt arrangement and, more particularly, to a reel construction for automatic safety belts in vehicles, especially motor vehicles, which includes a roller non-rotatably mounted in a housing which roller is subjected to the action of a spring means in such a manner that a withdrawal of the safety belt is counteracted and with a locking means for locking the roller in response to high forces acting upon the safety belt.

Safety belt systems have been proposed wherein a normal reel spring is provided in the reel which is adapted to take up the safety belt; however, such proposed constructions have special problems and the present invention provides two possibilities for dealing with such problems.

In some proposed automatic safety belt systems, a comparatively strong reel spring is employed so that the force required to withdraw and retract the belt is correspondingly high. An advantage of this proposed type of belt system resides in the fact that a reliable reeling-in of the safety belt is ensured when the belt is stored or not in use. However, a disadvantage of these proposed systems resides in the fact that the strongly retractive force of the belts is perceived as being uncomfortable and burdensome to the vehicle passengers wearing the belt.

In another group of proposed automatic safety belt systems, the roll-up spring is designed in the reel so as to be so weak that the force required to pull out or retract the belt is relatively small and is therefore perceived as comfortable by the vehicle passengers wearing the belt. However, such a proposed safety belt system necessarily leads to the disadvantage that the low retracting force of the reel spring does not ensure reliable reeling-in of the stored belt.

The aim underlying the present invention essentially resides in providing a reel construction for an automatic safety belt system for motor vehicles which satisfies both the above-noted requirements, namely, satisfactory and safe reeling-in performance coupled with good wearer comfort.

According to advantageous features of the present invention, a spring-loaded drag disk is eccentrically mounted on a gear which is nonrotatably connected with the roller with the drag disk including an engagement means adapted to cooperate with the gear in a bearing area thereof in a belt take-up direction, and subjected to tension from an additional spring in the belt unreeling direction, with a stop means being provided on the reel housing for delimiting rotational movement of the spring-loaded drag disk. Stop means cooperates with two matching stops on the spring-loaded drag disk, and the reel housing includes a curved control and guide surface which cooperates with the guide means on the spring-loaded drag disk.

Safety belt systems equipped with a reel in accordance with the present invention can readily be put on and taken off in the previous known fashion; however, by contrast with the previously proposed automatic safety belts, the vehicle passengers wearing such belts are subjected to a much reduced extension and retraction force by comparison with the "normal extraction" and retraction force when in any seated position and hence with the safety belt in any position. Additionally, only a slight forward movement of the body is required. The "normal" extension and retraction force for the safety belts is understood here to be a force which ensures a reliable rolling-up of the safety belt.

The above-noted reduced force of the safety belt to be caused by a slight movement of the body, on the one hand, depending on a length of the belt still remaining on the roller, results in a sufficiently large belt extension area when the belt is being worn to allow the vehicle passengers wearing the safety belt to move within certain limits with the belt on, without the comfort range being exceeded and thus becoming ineffective.

With the reel construction in accordance with the present invention, if the wearer of the safety belt moves forward beyond the comfort range, the wearer is then subjected to the action of the normal or stronger belt extraction force. Even when the vehicle passenger moves backward, only a reduced force prevents this in the stated area, if this range is exceeded, the normal or stronger retraction force of the belt becomes effective.

An important advantage of the present invention resides in the fact that the vehicle passenger wearing the safety belt is subjected only to a reduced belt force when in his normal seated position, in addition to a certain tolerance range for slight movements. Nevertheless, a reliable rolling-up of the safety belt, especially when the safety belt is to be stored, is ensured by virtue of the increased retraction force which then comes into play.

In accordance with another advantageous embodiment of the present invention, the teeth of the gear may be made so as to be sawtooth-shaped with a spring-loaded drag disk being provided on its bearing area with one or more inwardly projecting toothed projections as engagement means in such a manner that the gear engages the projections only when the roller is rotating or turning in a belt take-up direction; whereas when the roller rotates in an opposite direction, the gear slides over the projections which then simultaneously raise the spring-loaded drag disk.

Thus, the present invention in principle essentially proposes two spring systems operating in opposite directions. One spring system is the conventional, continuously active belt take-up spring with the additional spring system counteracting the take-up spring which additional spring system can only act when the spring-loaded drag disk is engaged in the belt take-up direction by the gear.

In the construction of the present invention, a rotational path traveled jointly by the roller and spring-loaded drag disk when they are in a coupled position extend lengthwise as a function of the angular distance between the two stops on the spring-loaded drag disk. Preferably, in accordance with the present invention, it is proposed that the spring-loaded drag disk be provided with two indentations about 180° apart as stops on its outer circumference with the indentations cooperating with a pin serving as a stop, which pin is mounted on a housing of the reel. The path jointly traveled by the roller and the spring-loaded drag disk is a coupled position in this case corresponds to one half of a revolution of the above-noted parts.

In accordance with the present invention, the inwardly projecting tooth-shaped projections which serve as an engagement means on the spring-loaded drag disk together with one of the two stops of the spring-loaded drag disk lie on approximately the same radius. Moreover, the curved control and guide surface of the present invention may extend over a circumferential angle of about 180°.

In accordance with yet further features of the present invention, the spring-loaded drag disk includes a pin formed as a guide means which pin is guided during a rotation of the spring-loaded drag disk along an inner surface of a curved control and guide track.

In accordance with the present invention, the extension spring utilized as an additional spring on the spring-loaded drag disk has its other end fastened at the reel housing. Moreover, the spring-loaded drag disk of the present invention may include a sloping ramp which leads to a stop located approximately diametrally opposite the inwardly projecting tooth-shaped projections.

Additionally, according to the present invention, the engagement point of the additional spring and guide pin may be located approximately diametrally opposite each other on the spring-loaded disk whereby the guide pin is disposed near the inwardly projecting tooth-shaped projection.

Furthermore, the additional spring may be so disposed that at an end of the rotational path of the spring-loaded drag disk, after passing a dead-center point, the spring exerts a torque in an opposite direction on the spring-loaded drag disk.

Accordingly, it is an object of the present invention to provide a reel construction for an automatic safety belt system of a motor vehicle which avoids, by simple means, shortcomings and disadvantages encountered in the prior art.

Another object of the present invention resides in providing a reel construction for a safety belt system of motor vehicles which ensures a satisfactory and safe reel-in performance of the safety belt while at the same time maximizing the comfort to a wearer of the belt.

A further object of the present invention resides in providing a reel construction for a safety belt system of motor vehicles which is simple in construction and therefore relatively inexpensive to manufacture.

Yet another object of the present invention resides in providing a reel construction for a safety belt system which functions reliably under all operating conditions.

These and other objects, features and advantages of the present invention will become more apparent from the following description when taken in connection with the accompanying drawings which show, for the purposes of illustration only, one embodiment in accordance with the present invention, and wherein:

FIGS. 1–4 are side views of a reel construction in accordance with the present invention illustrating the parts thereof in four different operating positions;

Referring now to the drawings wherein like reference numerals are used throughout the various views to designate like parts and, more particularly, to FIG. 1 which is a somewhat schematic view which, for the sake of clarity, illustrates only those parts which are necessary for an understanding of the present invention, according to this figure, a rotatable roller 10 of a safety belt reel is disposed in a housing 11 with a rotational axis of the roller 10 being defined by a center axis intersection 12.

A gear 13, having sawtoothed-shaped teeth 14 is nonrotatably mounted on the roller 10 with a spring-loaded drag disk 15 being mounted eccentrically on the gear 13. A mid-point of the spring-loaded drag disk 15 is indicated by a centerline intersection point 16. A coil tension spring 18, serving as an additional spring, engages the spring-loaded drag disk at a pin or protrusion 17. The spring 18 has its other end fastened to a member 19 provided at the reel housing 11.

Figure 2:
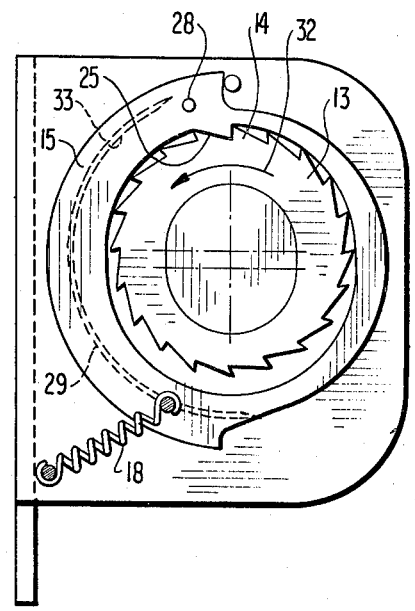

With the reel in the position illustrated in FIGS. 1 and 2, the extension spring 18 exerts a torque in the direction of an arrow 20 on the spring-loaded drag disk 15. The direction of the arrow 20 simultaneously shows the withdrawal rotational direction of the belt from safety belt reel.

The torque exerted on the spring-loaded drag disk 15 by the additional spring 18 causes the spring-loaded drag disk 15, with a stop 21, fashioned as an indentation, to come into contact with a matching stop fashioned as a pin 22, mounted on the reel housing 11, thereby causing the spring-loaded drag disk 15 to be held in place in the safety belt system. An additional 23, also fashioned as an indentation is located at a point on the spring-loaded drag disk 15 which is diametrically opposite stop 21. A bearing surface 24 of the spring-loaded drag disk 15, which is made eccentric or positioned eccentrically relative to the roller 10 is provided with an inwardly projecting, tooth-shaped projection 25 at a level of the stop 21 with the projection 25 being provided for functioning as an engagement means for cooperation with teeth 14 of the gear 13.

Additionally, a pin 28 is provided on the spring-loaded drag disk 15 with the pin 28 serving as a guide pin and cooperating with a curved control and guide track 29 provided on the reel housing 11. The control and guide track 29 is illustrated in dashed line with the pin 28 exerting a control and guide function. In the position of the reel shown in FIG. 1, the belt is being extracted and the roller 10 is rotated in the direction of the arrow 20. The teeth 14 of the gear 13 slide with their sloping surfaces 30 over a corresponding sloping surface 31 of the tooth-shaped projection 25 of the spring-loaded drag disk 15 lifting the disk 15 simultaneously through a degree of eccentricity designated e. The stop 21 which abuts matching stop 22 prevents the spring-loaded drag disk 15 from moving out of the rest position shown in FIG. 1 during a rotational movement of the roller 10 and gear 13. Thus, the roller 10 and safety belt wound up on the roller are subjected to the full force of a "normal" take-up spring (not shown). In the position illustrated in FIG. 2, the roller 10 is executing a rotational movement in a take-up direction of the belt indicated by the arrow 32. At the beginning of this rotational movement, the lifting action of the teeth 13 on the spring-loaded drag disk 15 is absent so that the disk 15, by virtue of its own weight, falls downwardly through the distance designated e. Then, as shown in FIG. 2, one of the teeth 14 of the gear 13 comes into mesh with the toothed-shaped projection 25 of the spring-loaded drag disk so that when the gear 13 rotates further in the rotational direction designated by the arrow 32, it engages the spring-loaded drag disk 15. FIG. 2 illustrates the very beginning of such an engagement movement.

The guide pin 28, mounted on the spring-loaded drag disk 15 engages an inner surface 33 of the fixed control and guide track 29 so as to cause the spring-loaded drag disk 15 to be lifted again relative to the gear 13, whereby the teeth 14 and projection 25 are effectively prevented from coming out of mesh during the rotational movement of the coupled gear 13 and drag disk 15.

At the same time, during the described rotational movement of the coupled gear 13 and drag disk 15, the additional spring 18 which counteracts this rotational movement is tensioned.

The retracting force which acts on the belt during a rolling-up process illustrated in FIG. 2, therefore constitutes the difference between the normal force of the take-up spring (not shown) and the force of the additional spring 18 which counteracts the force of the take-up spring.

Figure 3:
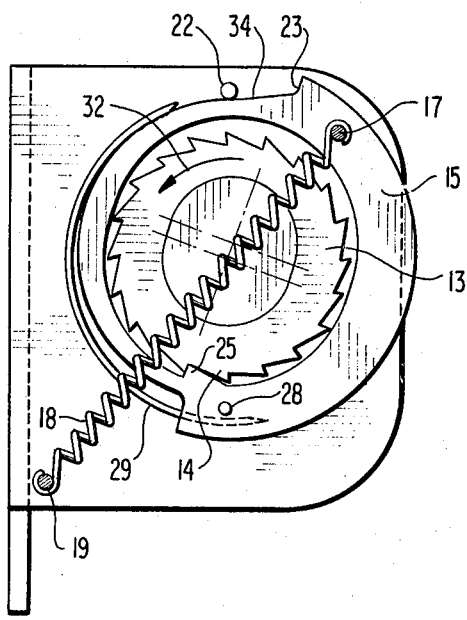

After the coupled gear 13 and spring-loaded drag disk 15 have rotated through an angle of nearly 180°, the spring-loaded drag disk 15 has reached the position illustrated in FIG. 3. In the meantime, before stop 23 on the spring-loaded drag disk 15 comes into contact with the matching stop 22, further rotation in the direction of the arrow 32 causes the guide pin 28 to come loose or be removed from the control and guide track 29 so that the teeth 14 and 25 can no longer be forced into mesh as shown most clearly in FIG. 4.

In the instantaneous position illustrated in FIG. 3, the spring-loaded drag disk 15 has reached a position in which the longitudinal axis of additional extension spring 18 intersects a midpoint 12 of the roller 10. With the elements in this state a dead-point position of the additional spring has been reached.

Figure 4:
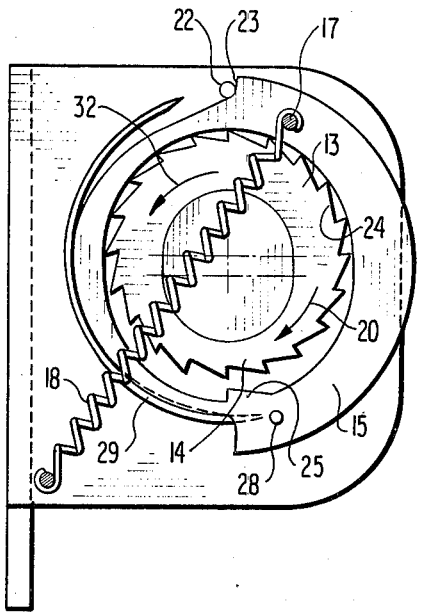

As the gear 13 continues to rotate, the parts shown finally reach a position illustrated in FIG. 4. As a result of the fixed matching stop 22 striking a sloping surface 34 and the escape of the guide pin 28 from the control and guide track 29, the teeth 14 and the projection 25 are forcibly brought out of engagement. Finally, the spring-loaded drag disk 15 engages matching stop 22 with its stop 23. In the meanwhile, the additional extension spring 18 has also exceeded its dead-point position shown in FIG. 3 so that the spring 18 exerts a torque in a direction of the arrow 32 on the spring-loaded drag disk 15 thereby causing the spring-loaded drag disk 15 to engage the matching stop 22 with its stop 23.

However, since the additional spring 18 is still tightly tensioned, there is a strong frictional link between bearing surface 24 of the spring-loaded drag disk and the gear 13. If the belt is then pulled out again in the rotational direction designated by the arrow 20, this frictional connection causes the spring-loaded drag disk 15 to be driven by the gear 13, initially against the extending movement exerted by the additional spring 18 on the spring-loaded drag disk 15. However, after a short period of time, a small rotational angle has been exceeded, the additional spring 18 again exceeds its dead-point position in FIG. 3 and now supports the driving movement of the spring-loaded drag disk 15 by gear 13 in the direction of the arrow 20.

However, the torque exerted by the additional spring 18 on the spring-loaded drag disk 15 in the direction of the arrow 20 immediately results in an "overtaking" of the gear 13 by the spring-loaded drag disk 15 so that the latter is guided backward over a short period of time into the fundamental position shown in FIG. 1, in which the spring-loaded drag disk 15 has its stop 21 against the matching stop 22 on the reel housing 11. However, this rapid retrieving motion of the spring-loaded drag disk 15 is not made possible solely by the pulling force of the additional spring 18, but also by the controlling function of the guide pin 28 on the one hand, and the control of the guide track 29 on the other hand. In fact, a forced release of the frictional connection between the gear teeth 14 of the gear 13 and bearing surface 24 of the spring-loaded drag disk is effected so that the latter can rotate freely with respect to the gear 13.

While I have shown and described only one embodiment in accordance with the present invention, it is understood that the same is not limited thereto, but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A reel arrangement for automatic safety belts of motor vehicles, the arrangement including roller means for accommodating the safety belt rotatably mounted in a housing, spring means connected to the roller means for providing a force counteracting a withdrawal of the safety belt from the roller means, and means for automatically locking the roller means upon the safety belt being subjected to high belt forces, characterized in that a gear means is connected to the roller means so as to be rotatable therewith, a rotatably mounted drag disk means is eccentrically disposed with respect to said gear means so as to enable the gear means to rotate relative to the drag disk means in a belt extraction direction, said drag disk means including a bearing surface means for carrying an engagement means for engaging said gear means in a belt take-up direction, an additional spring means connected with the drag disk means for exerting a force upon the drag disk means in opposition to the force of the spring means connected to the roller means thereby providing a reduced tension in the safety belt, stop means provided on the housing for limiting a rotational movement of the drag disk means, two additional spaced stop means are provided on the drag disk means and are adapted to come into engagement with said stop means on the housing, curved control and guide track means provided on the housing, and in that a guide means is provided on the drag disk means and cooperates with the curved control and guide track means for guiding a rotational movement of the drag disk means.

2. A reel arrangement according to claim 1, characterized in that the gear means is provided with teeth having a saw-tooth configuration, and in that the engagement means includes at least one tooth-shaped projection extending in a direction toward the teeth of the gear means, the teeth of the gear means and the at least one tooth-shaped projection being arranged such that an engagement between the teeth and tooth-shaped projection occurs only when the roller means is rotated in the belt take-up direction with the tooth-shaped projection sliding over the teeth of the gear means and simultaneously lifting the drag disk means when the roller means is rotated in a belt extraction direction.

3. A roller arrangement according to claim 2, characterized in that the two additional stop means are each formed as indentations in an outer circumference of the drag disk means and spaced approximately 180°0 apart, each of said indentations being adapted to engage the stop means provided on the housing in dependence upon a positioning of the drag disk means.

4. A reel arrangement according to claim 3, characterized in that the at least one tooth-shaped projection of the drag disk means and the two indentations forming the two additional stop means lie approximately along a common radial plane.

5. A reel arrangement according to claim 4, characterized in that the curved control and guide track means extends over a circumferential angle of about 180°.

6. A reel arrangement according to one of claims 2, 3, 4, or 5, characterized in that the guide means provided on the drag disk means includes a guide pin adapted to be guided along an inner surface of the control and guide track means during at least a portion of the rotational movement of the drag disk means.

7. A reel arrangement according to one of claims 1, 2, 3, 4, or 5, characterized in that the additional spring means has one end thereof secured to the drag disk means and the other end thereof secured to the housing.

8. A reel arrangement according to one of claims 3, 4 or 5, characterized in that the drag disk means includes a sloping ramp portion leading to the indentation forming one of the additional stop means which is approximately diametrally opposite the tooth-shaped projection on the drag disk means.

9. A reel arrangement according to claim 8, characterized in that the additional spring means has one end thereof secured to the drag disk means and the other end thereof secured to the housing.

10. A reel arrangement according to claim 9, characterized in that the guide means provided on the drag disk means includes a guide pin adapted to be guided along an inner surface of the control and guide track means during at least a portion of the rotational movement of the drag disk means.

11. A reel arrangement according to claim 10, characterized in that the additional spring means is secured to the drag disk means at a position approximately diametrally opposite the guide pin, and in that the guide pin is disposed on the drag disk means at a position near the tooth-shaped projection.

12. A reel arrangement according to claim 11, characterized in that the additional spring means is arranged between the housing and the drag disk means such that the additional spring means passes through a dead-center point and exerts a torque in an opposite direction of the drag disk means after the drag disk means is rotated through a predetermined path of rotation.

13. A roller arrangement according to one of claim 1, 2, 3, 4, or 5 characterized in that a portion of the bearing surface means is adapted to frictionally engage the gear means when one of said two additional stop means is in engagement with the stop means on the housing.

* * * * *